United States Patent
Ciraolo

[11] 3,747,347
[45] July 24, 1973

[54] POLLUTION PREVENTING EXHAUST DEVICE

[76] Inventor: Samuel Ciraolo, 1335 Fiori Ave., Modesto, Calif.

[22] Filed: Apr. 12, 1971

[21] Appl. No.: 133,157

[52] U.S. Cl. ............... 60/309, 55/DIG. 30, 55/446, 123/119 A
[51] Int. Cl. ......................... F01n 3/02, F02b 75/10
[58] Field of Search ..................... 60/278, 309, 311; 123/119 A; 55/446, DIG. 30; 181/70

[56] References Cited
UNITED STATES PATENTS

| | | | |
|---|---|---|---|
| 1,804,070 | 5/1931 | Sykes | 181/70 |
| 3,421,315 | 1/1969 | Aoi | 60/309 |
| 911,969 | 2/1909 | Gebhardt | 55/446 |
| 1,415,418 | 5/1922 | Wachter | 60/311 |
| 2,087,411 | 7/1937 | Lundquist | 60/309 |
| 2,115,228 | 4/1938 | Lundquist | 60/311 |

FOREIGN PATENTS OR APPLICATIONS

| | | | |
|---|---|---|---|
| 14,923 | 1909 | Great Britain | 55/DIG. 30 |

Primary Examiner—Wendell E. Burns
Attorney—George B. White

[57] ABSTRACT

A muffler-separator connected to the exhaust pipe of an engine includes a tubular elongated casing divided into chambers by baffles extended alternately from opposite walls of the casing leaving a space at the free edge of each baffle for the passage of products of combustion from chamber to chamber; the baffles are parallel and are inclined toward the intake end of the casing; the volume of the chamber at the intake end is about three times the combined volume of all the combustion chambers of the engine; the volume in each intermediate chamber is about the same as that of a single combustion chamber in the engine; the volume of the chambers nearer the exhaust end of the casing increases gradually; a trap underneath the casing collects trapped moisture which can be reintroduced into the engine.

7 Claims, 3 Drawing Figures

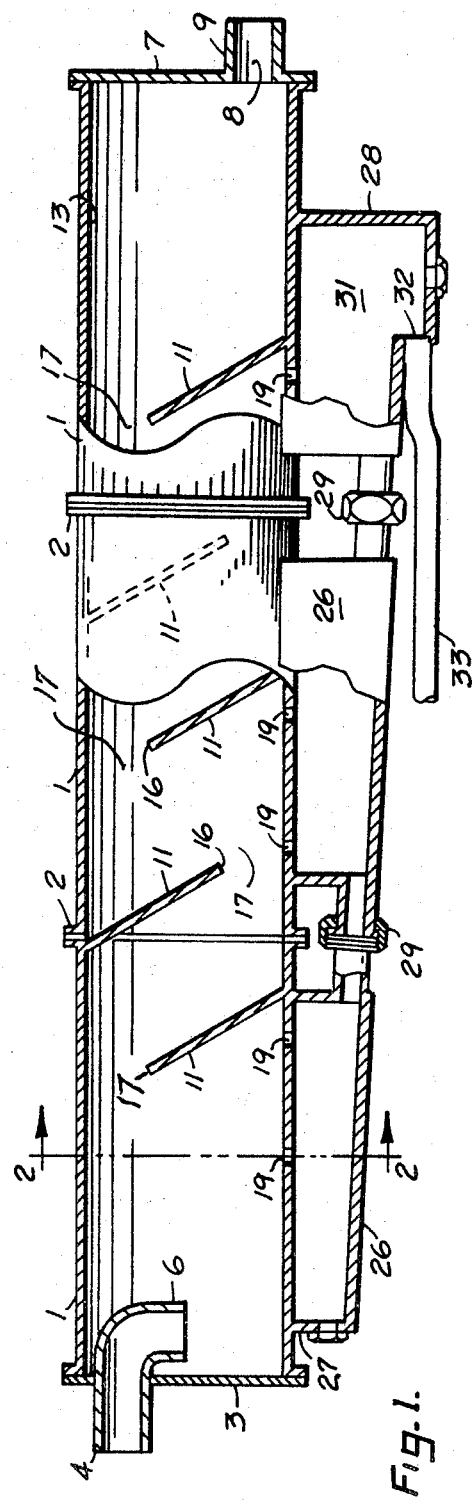
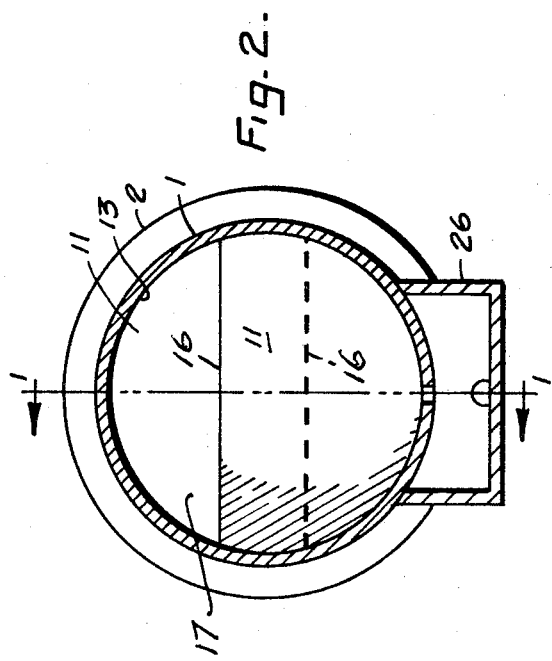

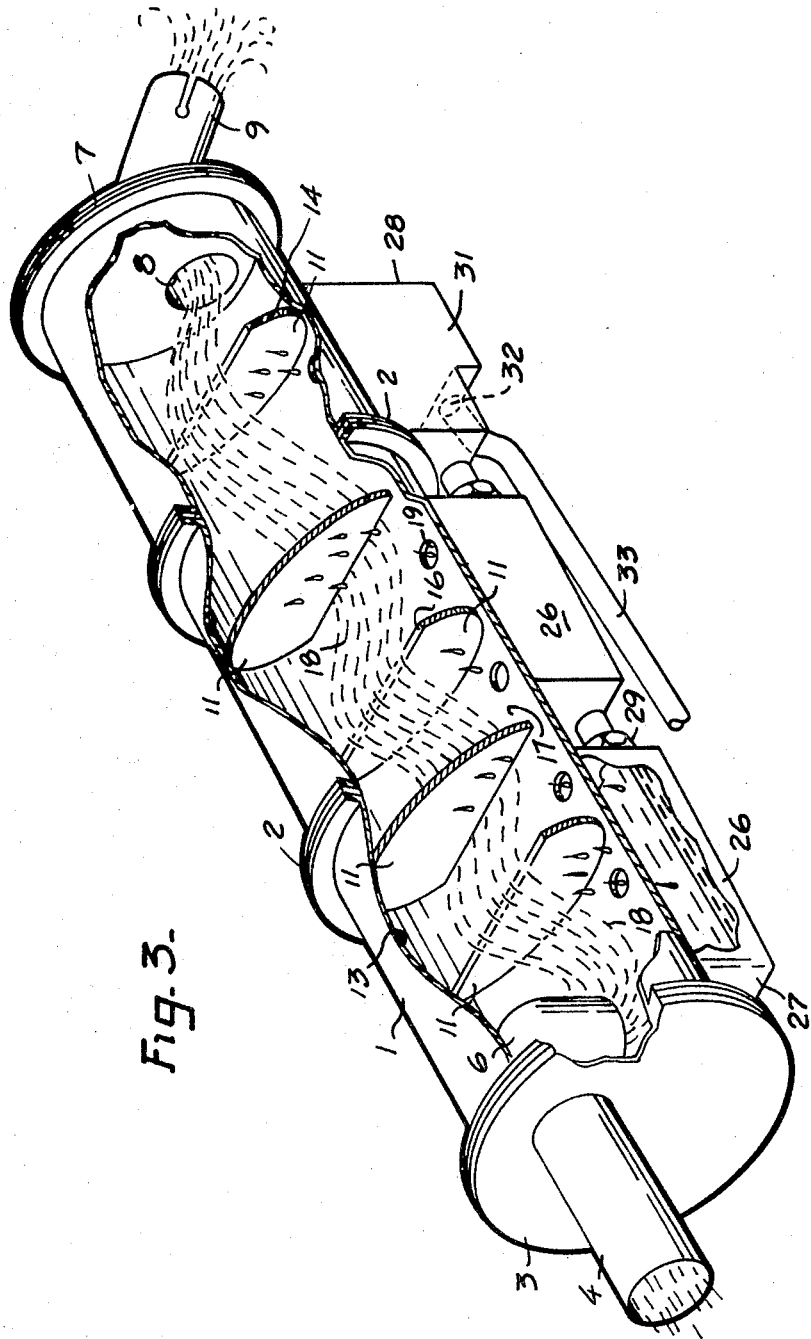

3,747,347

POLLUTION PREVENTING EXHAUST DEVICE

BACKGROUND OF THE INVENTION

Exhaust from engines, and particularly from automobiles, trucks and the like, creates problems of air pollution and of noise, which problems are not solved by present day mufflers. Numerous improvements in mufflers were evidently not sufficiently successful.

And object of this invention is to provide in a muffler casing baffles which so direct the flow of fumes from the engine that the changes of direction and velocity and impingement on the baffles cause precipitation or depositing of globules of fuel on the baffles and collected at and drained from the bottom portion of the casing.

Another object of the invention is to provide in a muffler casing a plurality of inclined baffles so related as to produce chambers of various volumes along the path of the fumes discharged thereby to expand the fumes entering the muffler and there vary the expansion and velocity as well as the direction of flow of the fumes producing a whirling action for precipitating and seprating liquid globules from the fumes, and reducing the temperature of the fumes, and reducing sound vibrations to a minimum without creating any substantial back pressure.

BRIEF DESCRIPTION OF THE FIGURES

FIG. 1 is a partly sectional view of the muffler separator, substantially on lines 1—1 of FIG. 2.

FIG. 2 is a substantially cross-sectional view of the muffler separator, the section being taken on lines 2—2 of FIG. 1.

FIG. 3 is a perspective view of the muffler separator, part of the casing broken away.

DETAILED DESCRIPTION

A casing 1 of the muffler is tubular and elongated and in this form is made of sections with suitably flanged joints 2 for assembling the sections together. An intake end wall 3 has a pipe 4 extended therethrough, the elbow 6 of which directs the flow of fumes with a 90° turn downwardly with respect to the assembled position of the casing 1. The intake pipe 4 is suitably connected to the exhaust of an engine not shown. Through an outlet end wall 7 of the casing 1 is an exhaust opening 8 to which is connected a tail pipe 9. The exhaust opening 8 is through the lower portion of the outlet end wall 7.

A plurality of baffles 11 are suitably secured, such as by welding its edges to the inner periphery of the casing 1 as shown in FIG. 1 and FIG. 2. The first baffle 11 nearest to the intake wall 3 of the casing 1 is spaced from said intake wall 3 so as to define a chamber substantially of a volume about three times of the combined volume of all the combustion chambers of the engine to which the muffler is connected. The second and third baffles 11 in sequence after the first baffle each define a space substantially of the same volume as that of a single combustion chamber in the engine. The fourth baffle 11 in sequence is so spaced as to increase the volume of the chamber between it and the second baffle, and the fifth baffle 11 nearest to the outlet wall 7 is spaced from the fourth baffle to further increase the volume, and is so spaced from the end wall 7 as to form a final chamber substantially the same volume as the first chamber.

The baffles 11 are secured alternately to opposite walls of the casing 1, namely the first, third and fifth baffles 11 are secured to the lower portion of the casing 1 while the second and third baffles are secured to the opposite or upper portion of the casing 1. Each baffle 11 has an arcuate edge 14 and a cut away edge 16 spaced from the respective adjacent inner surface 13 of the casing 1. In this manner passages 17 are formed alternately near the upper or lower portion of the casing 1. The flow of fumes as diagrammatically indicated by broken lines 18 is from the elbow 6 which extends toward the lower portion of the casing 1 then up through the passage 17 above the first baffle 11, then again downward below the second baffle 11 and then up and down again respectively above and below the third and fourth baffles 11 and then above the fifth baffle 11 and ultimately out through the outlet 8 and the tail pipe 9. While it is not indicated by the broken lines 18, it is to be understood that the flow of the fumes takes various eddying movements so that the whirling around and the centrifugal force as well as the impingement on the respective baffles 11 causes the separation or precipitation of the globular liquid particles from the fumes. It is also believed that the friction between the fumes and the baffles 11 produces static electricity of such charge as to attract some of the solid and liquid particles passing thereby in the fumes. The gases flow from the elbow 6, into the first chamber. The cross-section of the elbow 6, which is substantially smaller than the area of the first chamber into which it dischages, causing the gases or fumes to expand with rapidity. Then the volume and the velocity correspondingly changes in the subsequent chambers as the gases pass by the respective baffles 11 until the gases are again expanded in the space near the outlet of the muffler. This also contributes to the separation of liquid and some solid articles from the fumes.

The separation and precipitation is further aided by inclining the baffles 11 parallel and in the same direction. In the present illustration the first baffle, extending from the lower portion of the casing 1, is inclined upwardly and toward the intake end or the elbow 6 in the casing 1, and all the baffles 11 are parallel.

The lower portion of the casing 1 has holes 19 through which the collected liquid particles flow by gravity into a pan formed along the lower portion of the casing 1.

The pan 26 is inclined from its intake end 27 toward its outlet end 28 and is made in sections substantially fitting between the respective flanged joints 2 and are connected to one another by detachable pipe joints 29 which permit the separation of the units at the flanges even after assembly. At the outlet end 28 is formed a collecting space 31 which has an outlet 32 connected to a return pipe 33 which then can be suitably connected either to the air filter or directly to the intake manifold of the engine for reburning the collected liquid.

The herein device expands the exhaust gases and condenses the liquid therefrom without causing back pressure; it reduces the temperature of the exhaust. The elbow leading to the first chamber abruptly changes the gas flow 90°, downwardly, and the flow is then directed upwardly to the first passage 17. The sharp changes of direction produce centrifugal forces which hurl the heavy liquid globules against the adjacent surfaces of the baffles and the chamber to be collected by gravity. The gases travel through the device at a high velocity. The device in practice reduced the emission of impurities which cause smog, it proved economical, increased engine power and improved gas consumption and acceleration. The baffles diminish the sound waves of the exhaust so as to render the exhaust practically silent.

I claim:

1. In a pollution preventing device for engines, a closed tubular casing having a closed inlet end and a closed outlet end, said inlet end having an inlet connected to the exhaust of the engine, said outlet end having an outlet, a plurality of spaced baffles along said casing between said ends having their edges secured alternately to opposite wall portions of said casing and having unsecured edges spaced from the side of said casing thereby to provide passages alternately on opposite sides of said casing for changing the direction of flow of fumes several times between said inset and outlet end, The spacing between the first baffle and said inlet end being the largest, the spacing between the intermediate baffles being about equal and substantially less than the spacing of the first baffle from the inlet end, the secured edges of each baffle being imperforate thereby to limit the passage of fumes to the space at the unsecured edge of each baffle, said baffles being parallel and being inclined lengthwise in said casing in the same direction, said first baffle being inclined with its unsecured edge toward said inlet end, and said unsecured edges of the baffles overlapping the positions of the unsecured edges of the adjacent alternate baffles, a closed space along the lowest portion of said casing for collecting escaped liquid, said casing having apertures in said lower portion between said baffles for the escape of precipitated liquid particles into said closed space.

2. The invention specified in claim 1, and the spacing between the last baffle and said outlet end being about the same as the spacing of the first baffle from said inlet.

3. The invention specified in claim 2, and an inlet conduit through said inlet turned away from the passage at said first baffle for directing flow away from the first passage.

4. The invention specified in claim 3, and said outlet through said outlet end being offset from the passage at said last baffle.

5. The invention specified in claim 1, and said engine having several cylinders of about equal volume of displacement, said spacing of said first baffle from said inlet end forming a chamber of a volume about equal to the total volume of displacement in said engine, and each of said spacings between said intermediate baffles being about equal to the displacment in one cylinder of said engine.

6. The invention defined in claim 3, and the passage of said inlet conduit being considerable smaller than the cross-sectional area of said first spacing thereby to cause expansion of the fumes flowing therethrough.

7. The invention defined in claim 1, and said casing having apertures in its bottom wall between said baffles for the escape of collected liquid particles, and a closed pan on said casing along said apertures for collecting said escaped liquid.

* * * * *